Feb. 18, 1958   L. W. STRASBURGER   2,824,005
METHOD OF RECOVERING THE MEATS OF BIVALVES
Filed June 19, 1956

INVENTOR
Lawrence W. Strasburger
BY
Pennie Edmonds Morton Barrows Taylor
ATTORNEYS – # United States Patent Office

2,824,005
METHOD OF RECOVERING THE MEATS OF BIVALVES

Lawrence W. Strasburger, Metairie, La., assignor to Blue Channel Corporation, Port Royal, S. C., a corporation of Maryland Application June 19, 1956, Serial No. 592,354

6 Claims. (Cl. 99—111)

This invention relates to the treatment of bivalve molluscs, of which oysters, clams, mussels, and scallops are examples, and is concerned more particularly with a novel method by which the meats may be recovered from the shells of such bivalves easily and without damage to the meats. While the invention may be utilized in the treatment of bivalves generally, all the advantages of of the method are realized in its use in the treatment of oysters. Accordingly, a form of the method for the recovery of oyster meats will be illustrated and described in detail for purposes of explanation.

In the processing of oysters preparatory to canning, as heretofore practiced, the oysters have been washed, when necessary, to remove foreign matter adhering to the shells and the oysters are then steamed or cooked. For this purpose, the oysters may be loaded into crates or baskets, which are then placed in retorts heated by steam, or the oysters may be placed in cars which can be moved into a steam box. The recovery of the oyster meats from the shells requires that the adductor muscles of the oysters be freed from the inner surfaces of the valves and the tenacity with which the muscles adhere to the valves varies in oysters grown in different localities. The steaming of the oysters as now practiced, accordingly, varies in duration and temperature within a considerable range determined by experience. At the conclusion of the heating operation properly carried on, the shells of the oysters are found to have opened and the adhesion of the muscles to the valves is greatly weakened. The meats can then be recovered by manual operations or by tumbling the oysters in bulk in accordance with the practice of the method described in Harris Patent 2,608,716, issued September 2, 1952.

While use of the Harris method effects a substantial reduction in the costs of canning oysters, it has been found that, in oysters from beds in some localities, such as the Gulf of Mexico, the muscles adhere so tenaciously to the valves that the practice of the patented method does not yield as complete a recovery of the meats as is desirable. The present method is, accordingly, directed to a method of treating oysters and other bivalves, by which a substantially complete recovery of the meats from the shells can be easily obtained at low cost and with little or no damage to the meats, regardless of how tender the meats may be.

The method of the invention involves soaking the clean, raw oysters in brine of a salinity greater than that of their natural environment and heated to a temperature above ambient temperature but well below the boiling point of water. The soaking of the oysters in the hot brine is continued until the valves separate slightly and the saline solution enters the shells, after which the oysters are cooked by exposing them to a temperature well above 212° F. The cooking may be carried on by heating the oysters in a hot brine in a closed vessel or by steaming the oysters in such a vessel. The cooking is prolonged until the adductor muscles of the oysters are released from the inner surfaces of the valves or the adherence of the muscles to the valves is so weakened that the meats can be readily recovered from the shells by mechanical agitation of the oysters in bulk. The recovery of the meats from the shells of the cooked oysters may be carried out by tumbling the oysters in the apparatus of the Harris Patent 2,652,588, issued September 22, 1953.

For a better understanding of the invention, reference may be made to the accompanying drawing, in which.

Figure 1:
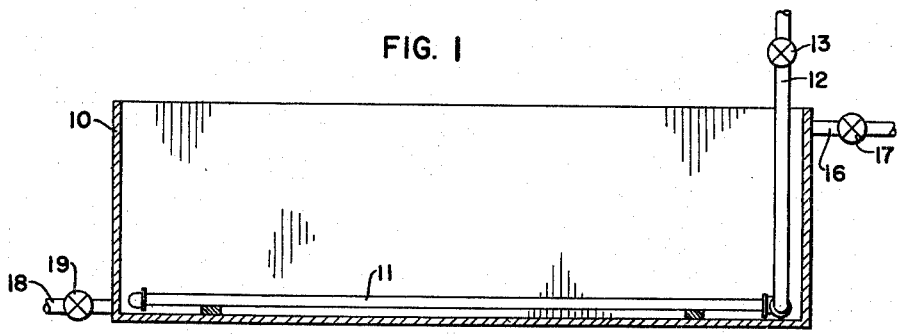
Figs. 1 and 2 are views in side elevation and plan, respectively, of a heating tank which may be employed in carrying out the first stage of the method of the invention.
Figure 2:
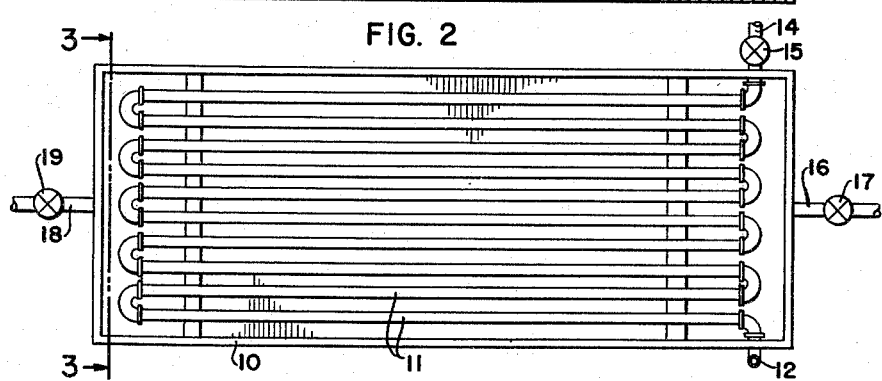

In the practice of the new method, the oysters should be clean and, in some localities, the oysters as landed at the dock require no cleaning, while oysters from other sources should be washed. In most cases, it is advantageous to subject the oysters to shock, and, when the oysters are clean, they may be given such a shock treatment by dropping them from a substantial height upon a hard surface. If the oysters require cleaning, they may be washed and simultaneously subjected to shock by passing them through a rotary washer drum of greater than ordinary diameter and provided with baffles, by which the oysters are repeatedly raised and allowed to fall. If the oysters require washing but the shock treatment is not to be used, they may be washed in a conventional rotary washing drum of relatively small diameter in which they are rolled and tumbled in a mass. In both forms of washing, water is sprayed on the oysters as they travel through the drum by means of spray pipes.

The clean oysters, whether or not subjected to shock, are now ready for the first stage of heating of the method of the invention. In carrying out this heating operation, the oysters may be conveniently loaded into the steel crates or baskets commonly used in the industry, and a number of the crates or baskets may be placed in an open-top tank such as tank 10. This tank contains a pipe coil 11, which is supplied with steam through an inlet pipe 12 having a valve 13, and has an outlet 14 with a valve 15. The tank has a liquid inlet pipe 16 with a valve 17 and a drain pipe 18 with a valve 19.

In carrying out the first stage of heating of the method of the invention in tank 10, the tank is filled with a saline solution of a salinity greater than the salinity of the water, in which the oysters grew. The salinity of the brine may vary from 10° to 50° salinometer at 60° F., and the brine solution is heated to a temperature ranging from 110° F. to 160° F. The oysers are immersed in the solution and allowed to remain for a period of from 3 to 8 minutes. A desirable treatment involves soaking the oysters for 4 minutes in a brine, which has a salinity of 20° salinometer at 60° F. and is maintained at about 135° F. during the soaking treatment.

The soaking of the oysers in the hot brine as described causes the oysters to gape and open, as when the oysters feed, and, as the shells open, the salt brine of somewhat greater strength than that of the natural environment of the oysters enters their shells. As a result, there is a change in the density of the liquor within the shells of the oysters and the adductor muscles become weakened. Such weakening of the muscles facilitates the separation of the muscles from the shells in the final stage of the method.

Following the preliminary soaking of the oysters in the saline solution as described, the oysters are cooked by exposing them to a temperature in the range from 235° F. to 260° F. for a period from 4 to 20 minutes. In order to attain the desired temperatures, the oysters must be heated in a closed vessel, in which the pressure ranges from 8 lbs. to 20 lbs. during the cooking operation. The cooking of the oysters by steam may be carried out in a standard steam box or a standard retort, such as that shown in Figs. 4 and 5.

Figure 4:
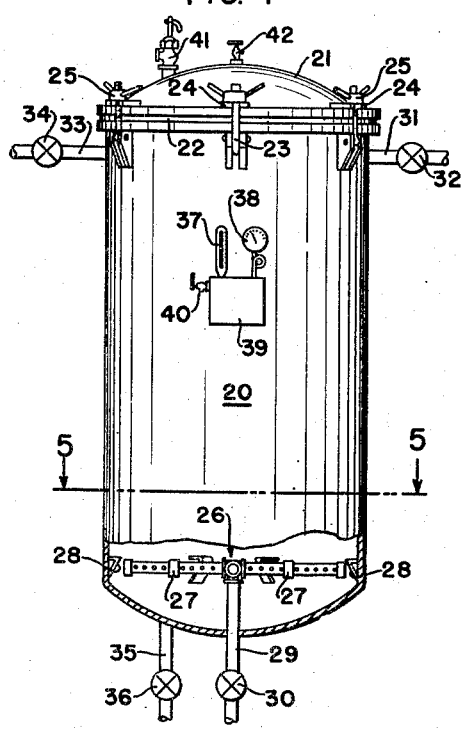
Fig. 4 is a view in side elevation of a conventional retort, which may be used in the practice of the invention.
Figure 3:
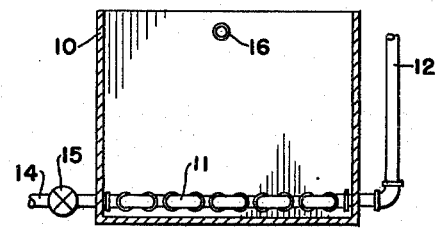
Fig. 3 is a sectional view on the line 3—3 of Fig. 2.
Figure 5:
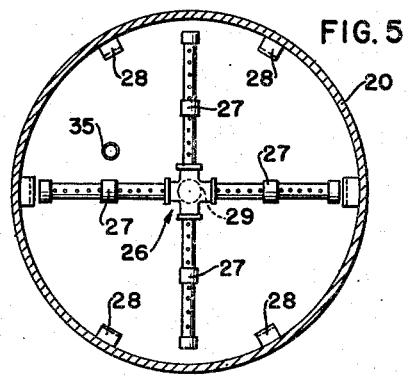
Fig. 5 is a sectional view on the line 5—5 of Fig. 4.

The retort illustrated in Fig. 4 includes a steel cylinder 20 having a cover hinged to the upper end thereof, so that the cover can be swung to close or open the top of the cylinder. In closed position, the cover fits upon a gasket 22, and bolts 23, pivoted on the cylinder and receivable between pairs of ears 24 on the cover, have wing nuts 25, which are engageable with the ears and operable to clamp the cover tight against the gasket. A steam distributor 26 in the form of a cross of perforated pipes is mounted in the cylinder near the bottom and collars 27 on the pipes and brackets 28 on the inner surface of the cylinder provide supports for the oyster crates or baskets. Steam is supplied to the cross through a steam pipe 29 with a valve 30.

The cylinder is provided near its upper end with a liquid inlet pipe 31 having a valve 32 and also with an upper steam vent and exhaust pipe 33 with a valve 34. At its lower end, the cylinder has a lower steam vent and bottom drain pipe 35 with a valve 36, and a thermometer 37 and a pressure gauge 38 are mounted on a box 39 open to the interior of the retort and having a small manually-operated bleeder valve 40. The cover is provided with a similar valve 41 and a safety valve 42. The bleeders are of small diameter such as ¼" to 2" in diameter and the bottom vent and drain 1" to 2". If desired, the retort may be provided with automatic temperature control bottom vent and drain 1" to 2'. If desired, the retort means.

In the use of the retort, the crates or baskets if oysters, which have been subjected to the preliminary brine soaking treatment, are loaded into the retort and the cover is swung shut and clamped tight. While the top and bottom vent valves 34 and 36 are partly opened, steam is introduced through the steam supply pipe 29 and, after a short time, the valves are closed and the steam supplied at such a rate that the interior of the retort is heated to temperatures within the range of 235° F. to 260° F. and the pressure ranges from 8 lbs. to 20 lbs. The oysters are cooked under the conditions specified for a period ranging from 4 to 20 minutes, the duration and temperature of the cooking depending upon the source of the oysters, the thickness of their shells, their maturity, shell growth factors, and the size of the adductor muscules of the oysters. Desirable conditions for cooking involve the use of a temperature of 250° F. with the pressure at 15 lbs. and a cooking time from 6 to 8 minutes.

At the completion of the cooking operation, the top steam vent is opened and the steam supply cut off. The crates or baskets are then removed from the retort and the separation of the meat from the shells is completed by agitation of the oysters as disclosed in the Harris Patent 2,652,588. In the drum of the patent, the oysters are lifted and dropped as the drum rotates and the separated meats escape from the openings in the drum wall, while the shells are discharged at the end of the drum.

The method as above described involves carrying out the preliminary soaking of the oysters in tank 10, following which the final cooking is carried out in retort 20. If desired, the two stages of the heat treatment may be carried on while the oysters are immersed in the brine solution. In practicing this form of the method, a retort, such as that shown in Figs. 4 and 5, may be employed with the brine introduced through inlet 31 to fill the retort to such a level that, when the crates are placed thereon, the oysters in the crates are beneath the level of the liquid. The brine used is that previously described, that is, one having a salinity varying from 10° to 50° salinometer at 60° F., and the brine is initially raised to a temperature from 110° to 160° F. by steam introduced through the distributor 26. The oysters are soaked in the brine for a period of 3 to 8 minutes and it is advantageous to soak the oysters for 4 minutes in a brine, which is maintained at about 135° F. and has a salinity of 20° salinometer at 60° F. When the preliminary soaking has been completed, the retort is closed by the shutting of the cover and the closing of the top steam vent valve 34, after which the steam supply is increased so that the temperature of the brine is raised to a point within the range of 235° F. to 260° F. with the pressure within the retort ranging from 8 lbs. to 20 lbs. The oysters are cooked in the hot brine for a period from 4 to 20 minutes. A desirable cooking operation in brine involves subjecting the oysters for a period of 8 to 12 minutes at a temperature of 250° F. within the brine.

At the completion of the cooking operation, the top steam vent valve 34 is opened to release the pressure and this causes turbulence within the saline solution in the retort. Such turbulence has a loosening effect upon the hinges of the oysters and the valves spread widely apart, thus making the meats more readily accessible and more easily removed. In many instances, the muscles of the oysters are wholly released from the shells or the adherence of the muscles to the shells is so weakened that the turbulence causes the meat to be separated from the shells.

Following the cooking in the hot brine as described, the meats may be separated from the oysters by agitation in bulk, as by the use of the rotary drum of the Harris Patent 2,652,588.

I claim:

1. A method of recovering the meats from oysters and other bivalves, which comprises soaking the clean raw bivalves for a period of from 3 to 8 minutes in a brine of a salinity of from about 10° to about 50° salinometer at about 60° F. and heated to a temperature within the range from about 110° F. to about 160° F., and thereafter cooking the bivalves by exposing them to a temperature of from about 235° F. to about 260° F. for a period of from 4 to 20 minutes.

2. The method of claim 1, in which the brine has a salinity of about 20° salinometer at about 60° F., the temperature of the brine is about 135° F., and the soaking time is about 4 minutes.

3. The method of claim 1, in which the bivalves are cooked by being confined in steam under a pressure ranging from about 8 lbs. to about 20 lbs.

4. The method of claim 3, in which the bivalves are cooked at a temperature of about 250° F. and a pressure of about 15 lbs. for a period of from 6 to 8 minutes.

5. The method of claim 3, in which the bivalves are immersed in brine during the cooking operation and the brine has a salinity of from about 10° to about 50° salinometer at about 60° F.

6. The method of claim 5, in which the brine used in the cooking operation has a salinity of about 20° salinometer at about 60° F., the temperature of the brine is 250° F., and the cooking time from about 8 to about 12 minutes.

References Cited in the file of this patent

UNITED STATES PATENTS

| | | |
|---|---|---|
| 2,041,727 | Prytherck et al. | May 26, 1936 |
| 2,051,676 | Bloedorn | Aug. 18, 1936 |
| 2,155,308 | Harris | Apr. 18, 1939 |
| 2,297,411 | Henning | Sept. 29, 1942 |
| 2,608,716 | Harris | Sept. 2, 1952 |